United States Patent [19]

Peters

[11] 4,025,276

[45] May 24, 1977

[54] BLOW MOLDING APPARATUS

[75] Inventor: Donald L. Peters, Bartlesville, Okla.

[73] Assignee: Phillips Petroleum Company, Bartlesville, Okla.

[22] Filed: Feb. 13, 1976

[21] Appl. No.: 657,830

[52] U.S. Cl. .................. 425/387 B; 425/DIG. 204
[51] Int. Cl.² ........................................ B29C 17/07
[58] Field of Search ............. 425/387 B, DIG. 204, 425/326 B, 340, 305 B, 302 B, 395, DIG. 11; 264/194, 198

[56] References Cited

UNITED STATES PATENTS 3,754,851  8/1973  Reilly et al. .................... 425/387 B

FOREIGN PATENTS OR APPLICATIONS 1,475,911  7/1967  France ................................ 264/98

Primary Examiner—Richard B. Lazarus

[57] ABSTRACT

An apparatus for blow molding hollow articles from a heated parison of plastic with the apparatus including a blow mold having mold halves which are relatively movable and receive the parison therebetween. A mandrel is provided which is comprised of two halves each of which is carried by a respective mold half with the mandrel being movable between an extended position and a retracted position. A free end of each of the mandrel halves is adapted to engage a portion of the parison to hold same between the two mandrel halves thereby providing rigidity and support for puncturing of the parison by a blow needle which is reciprocably carried by one of the mandrel halves and is movable between an extended position and a retracted position.

4 Claims, 7 Drawing Figures

BLOW MOLDING APPARATUS

The present invention relates to a blow molding apparatus which has means to facilitate puncturing of a heated parison by a blow needle. Parisons used for blow molding have very little rigidity and therefore pose problems for the puncturing of same by a blow needle. The lack of rigidity of a heated parison presents difficulty in puncturing of the parison by the blow needle as for example, the blow needle can either push the parison aside or forward or not fully penetrate the parison wall thereby preventing puncturing of same which would then result in a scrap part because same would be unblown or partially blown. One often used method of alleviating the problem of unblown or partially blown parts was to introduce air into the parison before attempting to puncture same with the blow needle with this particular method being commonly referred to as preblow. Preblowing of the parison increased the rigidity of the parison to improve puncturing of same with the blow needle. However, this method did pose some problems as, for example, timing of the preblow relative to movement of the blow needle for puncturing the parison was very important to assure that the blown articles would be of consistent quality.

The principal objects and advantages of the present invention are: to provide a blow molding apparatus using a blow needle, with means to support a parison to facilitate insertion of the blow needle through the wall of the parison; to provide such an apparatus wherein the means which provide support for the parison include a mandrel having two halves which grip a portion of the parison to retain same against movement during insertion of the blow needle through the wall of the parison; to provide such an apparatus which provides consistent punctures of the parison and therefore improves the uniformity of quality of the blow molded article; and, to provide such an apparatus which is simple in construction and operation and well adapted for its intended use.

Other objects and advantages of the present invention will become apparent from the following detailed description taken in connection with the accompanying drawings wherein are set forth by way of illustration and example certain embodiments of the present invention.

Figure 1:
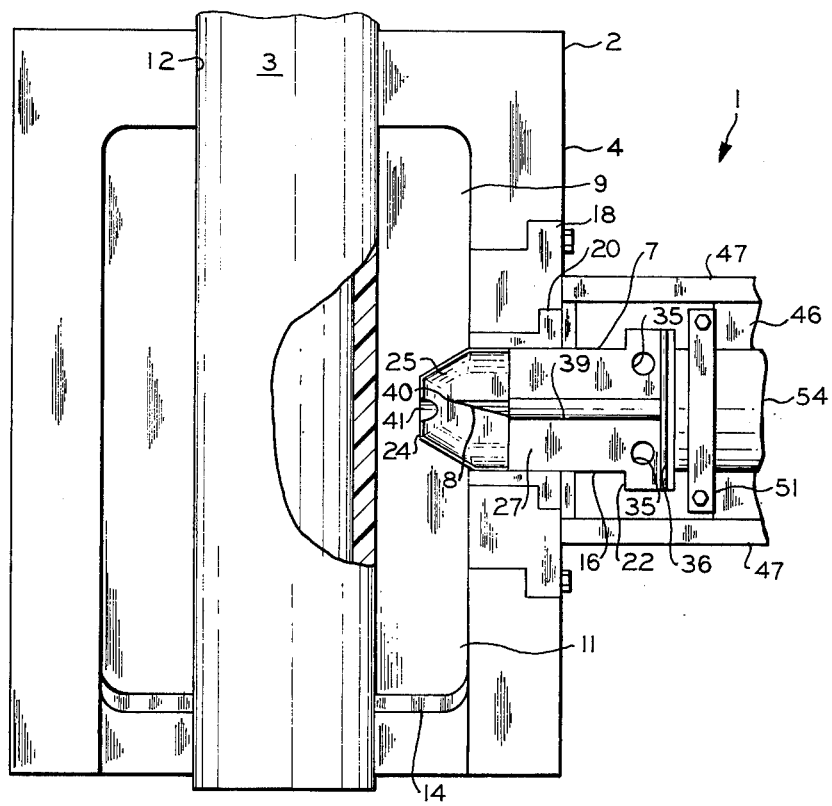
FIG. 1 is a fragmentary side elevation view of a blow mold having a respective mandrel half in a retracted position and a blow needle in a retracted position.
Figure 2:
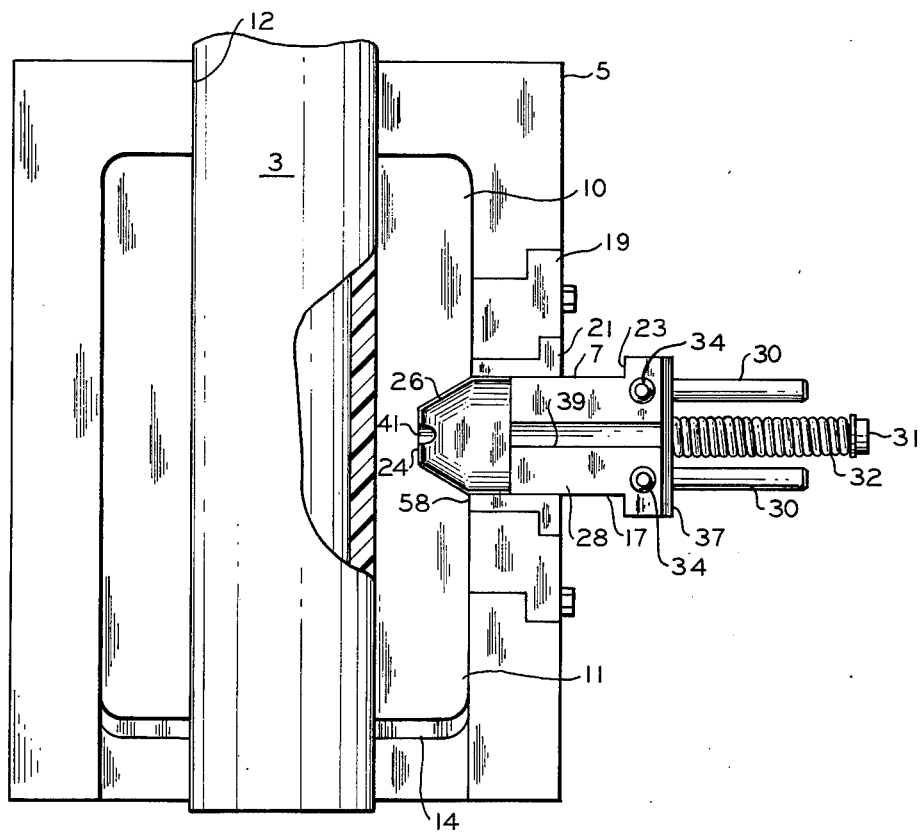
FIG. 2 is a fragmentary side elevation view of the other half of the blow mold having the other half of the mandrel shown in a retracted position.

Referring more in detail to the drawings:

As required, detailed embodiments of the present invention are disclosed herein, however, it is to be understood that the disclosed embodiments are merely exemplary of the invention which may be embodied in various forms. Therefore, special structural and functional details disclosed herein are not to be interpreted as limiting but merely as a basis for the claims and as a representative basis for teaching one skilled in the art to variously employ the present invention in virtually any appropriate detailed structure.

The reference numeral 1 designates generally a blow molding apparatus which in the illustrated structure includes a blow mold 2 which is adapted to receive a portion of a parison 3 between mold halves 4 and 5. A mandrel 7 has portions thereof reciprocably carried by respective mold halves 4 and 5 as more fully described hereinbelow. A blow needle 8 is reciprocably mounted in a portion of the mandrel 7 and preferably is independently movable relative thereto. Means 6 is also provided to effect the movements of the mandrel 7 and the blow needle 8. The mandrel 7 is adapted to have portions thereof movable relative to one another for gripping engagement with a portion of the parison to retain a portion of same against movement to facilitate puncturing of the parison by the blow needle 8.

The blow mold 2 is of generally standard construction as is known in the art and is comprised of the two mold halves 4 and 5 each of which has a cavity defining surface 9 and 10, respectively, therein. The cavity 11 defined by the surfaces 9 and 10 can be of any suitable shape or size and here it is to be noted that the present apparatus is particularly adapted for use in larger molds to make larger blown articles, say for example, articles of one gallon capacity or larger. In the illustrated structure, the size of the mold 2 adjacent an extruder has an opening 12 therethrough for receiving the parison 3 and the opposite side of the mold 2 has a pinch-off area 14 to seal the end of the parison as is known in the art. The mold 2 is mounted suitably on portions of a blow molding machine (not shown) as are well known in the art whereby the molding machine effects movement of the mold halves 4 and 5 relative to one another from an open position to a closed or molding position. The mold halves 4 and 5 are moved by suitable means 13 which are well known in the art such as extendable rams.

In the illustrated structure the mandrel 7 is of two-piece construction having substantially matching halves 16 and 17 preferably with the half 16 carried by the mold half 4 and the mandrel half 17 carried by the mold half 5. The halves 16 and 17 are reciprocably mounted in a respective bearing 18 or 19, each of which is secured to the respective mold half 4 and 5, as for example, the bearings 18 and 19 are each secured in an insert 20 or 21, respectively, which is in turn secured to the respective mold half 4 and 5. As shown, the inserts 20 and 21 form a portion of the cavity defining surface of the respective mold half.

Figure 3:
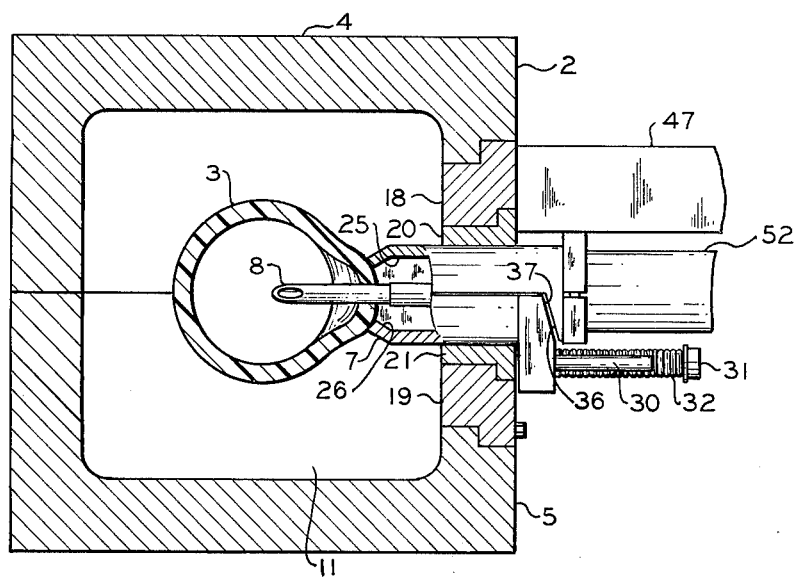
FIG. 3 is a fragmentary top view of the blow mold showing both halves of the blow mold and both halves of the mandrel with the mandrel in an extended position and in gripping engagement with the parison.

In the illustrated structure, the mandrel 7 has a generally round cross-section when the mandrel halves 16 and 17 are in engagement with one another and each has a shoulder-forming portion 22 and 23, respectively, which limits the amount of movement of the mandrel 7 to its extended position as best seen in FIG. 3. The mandrel 7 has a free end 24 with each of the mandrel halves 16 and 17 having a recess 25 and 26, respectively, in the mating surfaces 27 and 28 thereof for a purpose to be later described. In the form shown, the surfaces 27 and 28 are substantially coplanar with the respective mating surface of the mold halves 4 and 5.

The mandrel half 17 is suitably mounted to allow reciprocating movement and is retained against rotation and, as shown, is mounted on guides such as a pair of spaced apart bearing rods 30 which extend through bearings 29 which are mounted in a portion of the mandrel half 17 providing support for the mandrel half 17. As shown, the mandrel half 17 can be spring loaded for bias to an extended position such as by having an elongate pin 31 secured to the insert 21 and having a spring 32 positioned between a head portion of the pin 31 and the mandrel half 17 to spring bias same to the extended position. Means is provided to couple the mandrel half 16 to the mandrel half 17 to effect joint movement of same between the extended position and the retracted position. As shown, the means includes a pair of spaced apart pins 34 mounted in the mandrel half 17 and extending outwardly from the surface 28 and the mandrel half 16 has a pair of spaced apart bores 35 adapted to receive the pins 34 therein when the mandrel halves are adjacent one another upon closing of the mold halves. When the mold halves are separated or moved to an open position, the pins 34 are retracted from the bore 35 whereby the mandrel halves are no longer coupled and under spring bias force the mandrel half 17 moves to its extended position. A guide surface 36 extends from the mandrel half 16 and is adapted to engage a mating guide surface 37 of the mandrel half 17 to help align the mandrel halves 16 and 17 to assure proper location of the pins 34 for easy insertion into the bores 35.

A blow needle 8 is reciprocably mounted in the mandrel 7 and, as shown, is mounted in an elongate guideway 39 and is reciprocably movable therein. An opening 41 is provided adjacent the end 24 so that the blow needle 8 can extend outwardly therefrom for puncturing of the parison 3. As shown, the free end 40 of the blow needle 8 is beveled or sharpened to facilitate same penetrating through the wall of the parison 3.

Figure 4:
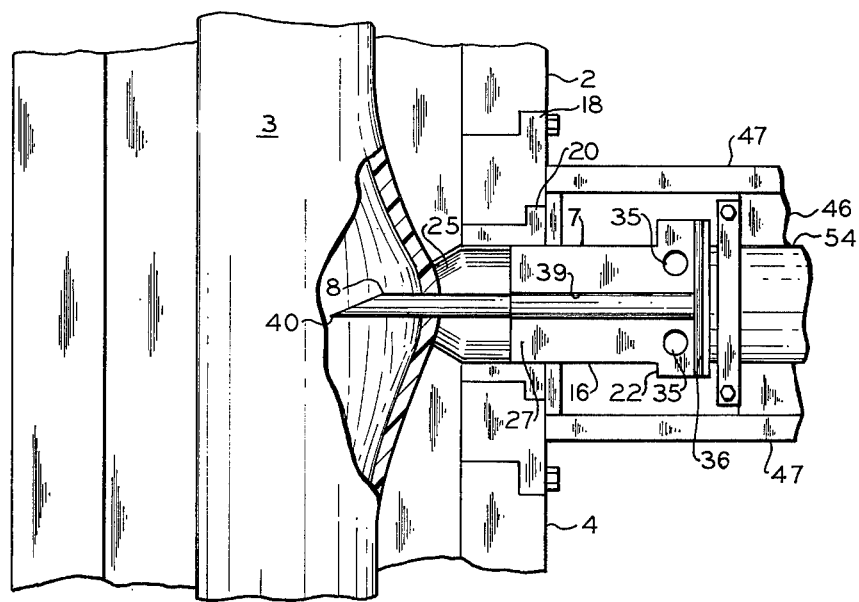
FIG. 4 is a fragmentary side elevation view showing one half of the blow mold and both halves of the mandrel with the mandrel in a retracted position and the blow needle in an extended position.
Figure 5:
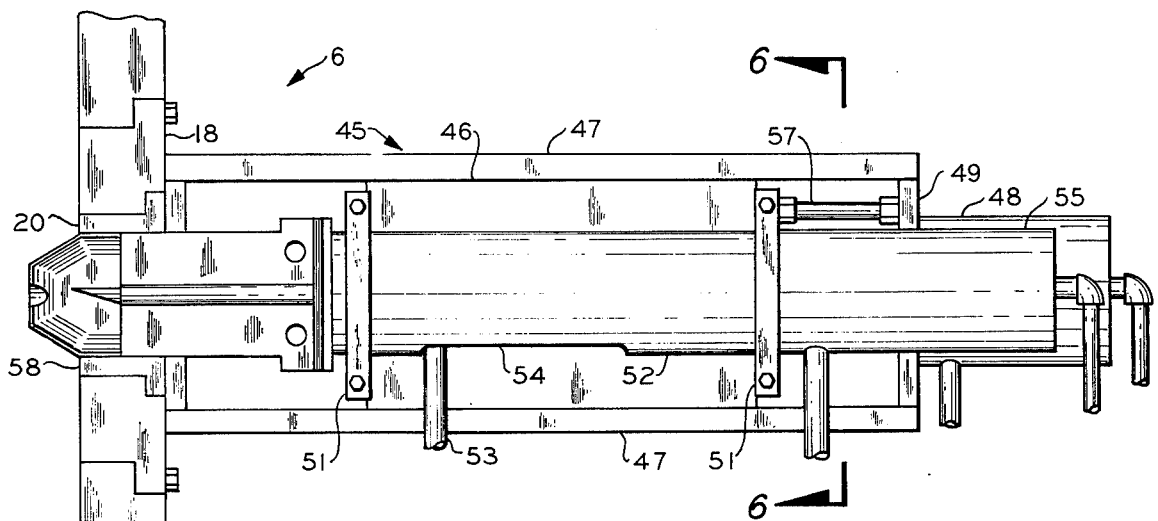
FIG. 5 is a side elevation view of means used to move the mandrel and blow needle.
Figure 6:
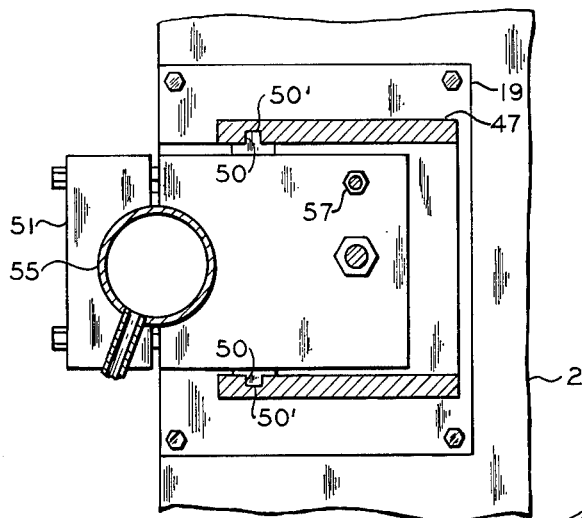
FIG. 6 is a section view taken along the line 6—6, FIG. 5.
Figure 7:
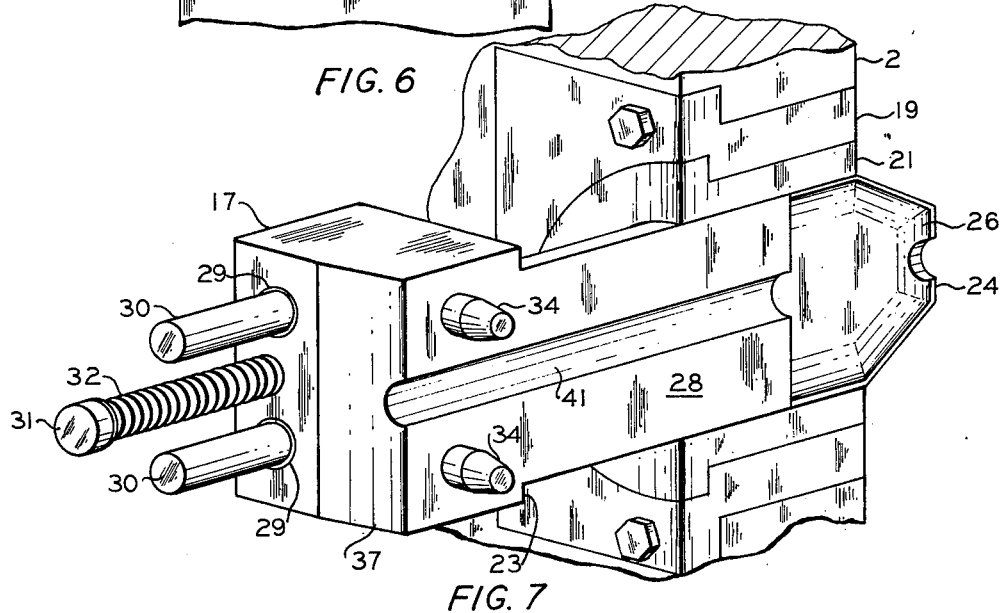
FIG. 7 is a fragmentary perspective view of one half of the blow mold and the mandrel half carried thereby.

Means 6 is provided to effect movement of the mandrel 7 and the blow needle 8 and the means 6 effects the movement of same independent of one another. The mandrel 7 moves in a plane or direction which is generally normal to the direction of movement of the mold halves 4 and 5 when same move between an open and closed position. Or stated otherwise, the mandrel 7 moves in a direction generally normal to the longitudinal axis of the parison 3 or the vertical axis of the mold 2 as seen in FIG. 4. Any suitable means can be provided and in the illustrated structure, the means 6 includes a support structure 45 which is preferably secured to the insert 20 as is best seen in FIG. 5. The support structure 45 extends from the insert 20 and has a slide member 46 movably mounted thereon such as by having guideways or grooves 50 in the plates 47. The grooves receive respective tongue portions 50' of the slide 46 to form a bearing and guide arrangement for the slide 46. Means is further provided to effect movement of the slide 46 and in the illustrated structure the means includes an extendable ram 48 which is preferably a double acting air cylinder which has the rod portion thereof suitably secured to the slide 46 with the ram being secured to a plate 49 of the support 45. Extension and retraction of the ram 48 effects reciprocating movement of the slide 46. Mounting brackets 51 are suitably secured to the slide 46 and a housing 52 is movable with the slide 46. Preferably, the mandrel half 16 is suitably secured to the bracket 51 and is movable therewith in response to movement of the slide 46. The housing 52 has an opening 54 which is elongate and has an air line connection 53 extending therethrough for connection to a suitable supply of compressed air for use in the blowing process. The opening 54 has a length sufficient to accommodate the necessary length of movement required for the blow needle 8 to penetrate the parison wall. Means is provided for effecting movement of the blow needle 8 independent of the mandrel 7 and, as shown, the means includes an extendable ram 55 which preferably is a double acting air cylinder which has the blow needle 8 suitably secured to the rod portion thereof (not shown) whereby extension and retraction of the ram 55 effects movement of the blow needle from an extended position for puncturing the parison 3 and a retracted position within the mandrel 7. Preferably, an adjustable stop 57 is provided to adjust the amount of retraction of the ram 48 so that the end 24 of the mandrel 7 can be adjusted in relation to a portion of the cavity forming surfaces 9 and 10 which, as shown, is partially defined by a surface portion 58 of the bearing 18 and insert 20. Forward movement of the slide 46 and, hence, forward movement of the mandrel 7 can be limited by either the stroke of the ram 48 or engagement of a portion of the slide 46 with a portion of the support 45. Movement of the blow needle 8 is limited as by the length of the stroke of the ram 55. Movement of the slide 46 effects movement of the mandrel 7, blow needle 8 and ram 55 while extension and retraction of the ram 55 effects movement of the blow needle 8 relative to the mandrel 7.

The present invention is more fully understood by a description of the operation thereof. A freshly extruded parison 3 which is hot and lacking in rigidity is extruded so as to be within the mold 2 positioned between the mold halves 4 and 5. Upon closing of the mold halves 4 and 5, the mandrel halves 16 and 17 are in an extended position and grippingly engage a portion of the parison 3 clamping same between the mandrel halves with a portion of the parison being retained within the recesses 25 and 26. The slide 46 is retracted, moving the mandrel 7 to its retracted position after which or during which the blow needle 8 is moved to its extended position and punctures the wall of the parison 2 whereby blow air can then be introduced into the parison 3 to blow the parison 3 into the shape as defined by the cavity of the mold 2. The engagement of the parison 3 by end portions of the mandrel halves 16 and 17 provide sufficient rigidity to allow puncturing of the parison by the blow needle 8. After blowing is completed, the blow needle 8 is retracted and upon opening of the mold 2 the mold halves 4 and 5 move away from the blown article and the mandrel halves 16 and 17 whereby the blown article can be removed for use. The mandrel halves 16 and 17 are then moved once again to their extended position for a repeat of the above-described cycle.

It is to be understood that while I have illustrated and described certain forms of my invention, it is not to be limited to the specific form or arrangement of parts herein described and shown.

What is claimed and desired to be secured by Letters Patent is:

1. A blow molding apparatus comprising:
   a. first and second mold portions forming a cavity, each said portion having a mating surface adapted to engage a mating surface of the other portion;

b. a mandrel with first and second halves each slidably mounted on a respective mold portion adjacent a respective mating surface and movable with a respective mold portion, said first and second halves have portions thereof which are operable to selectively engage a portion of a parison therebetween;

c. first means operably associated with said mandrel for effecting sliding movement of said first and second halves from an extended position wherein said mandrel portions are inside said cavity to a retracted position;

d. a blow needle slidably carried by one of the first and second halves; and e. second means operably associated with said blow needle for effecting movement of said blow needle between an extended position and a retracted position independent of movement of the mandrel half carrying same wherein in said extended position the needle penetrates the parison and is operable to supply pressurized fluid to the interior of the parison to expand the parison.

2. The apparatus as set forth in claim 1 wherein:

a. said mandrel moves in a direction which is generally normal to the direction of movement of said first and second mold portions between an open position and closed position.

3. The apparatus as set forth in claim 1 wherein:

a. said first and second halves each have a surface generally coplanar with the respective mating surface of the mold portion, the first and second halves each have a free end with a recess in the respective mating surface with the recess of one half facing the recess in the other half.

4. The apparatus as set forth in claim 3 including:

a. third means associating with said first and second halves coupling same together, allowing movement of the first and second halves toward and away from one another and joint movement of the halves between the extended position and retracted position.

* * * * *